March 24, 1964 J. SHIRMAN 3,126,449
NOISE DISCRIMINATOR
Filed Sept. 15, 1960
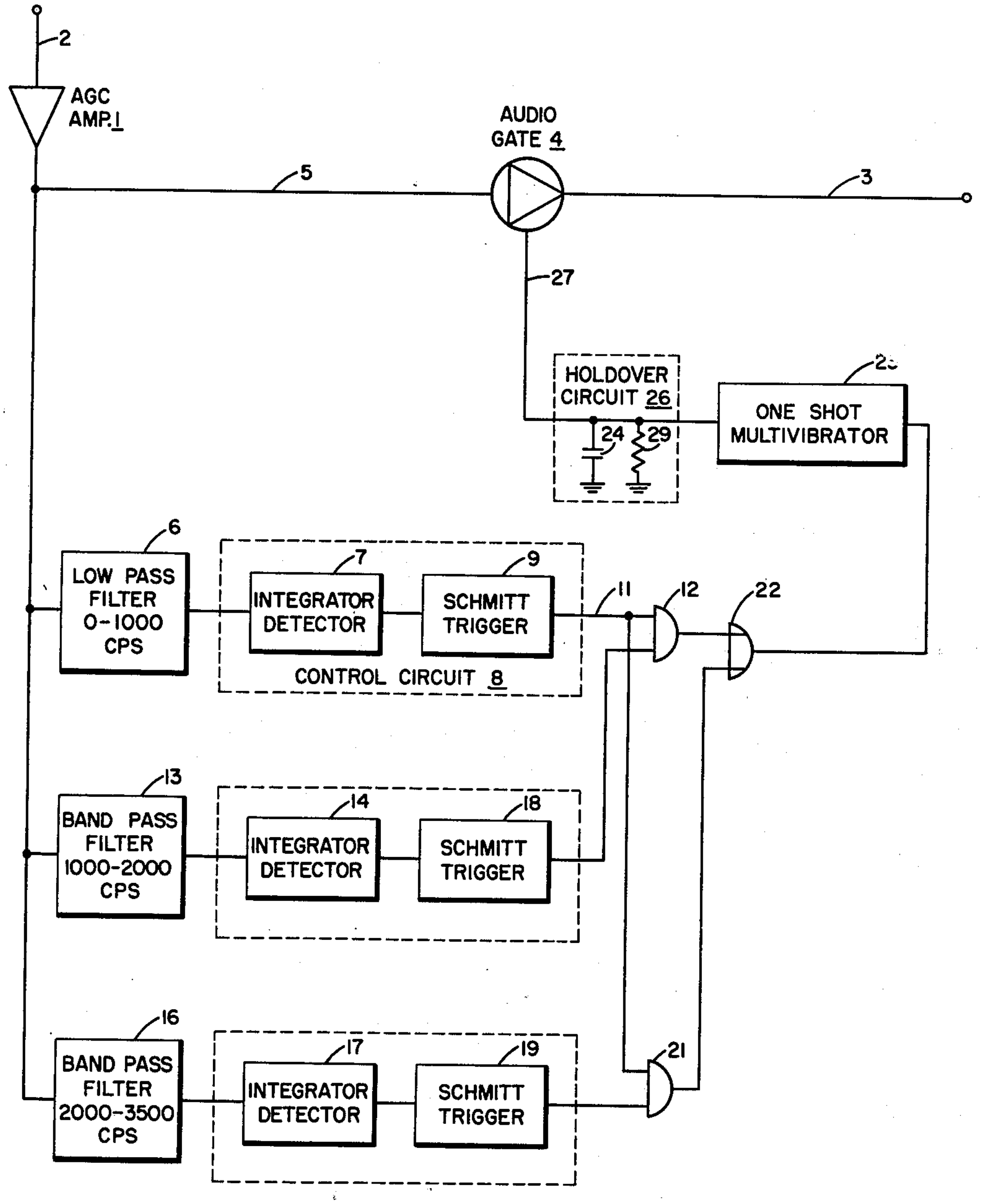
INVENTOR.
JACK SHIRMAN
BY Robert L. Nathans
ATTORNEY United States Patent Office 3,126,449

Patented Mar. 24, 1964

3,126,449

NOISE DISCRIMINATOR

Jack Shirman, Penfield, N.Y., assignor to General Dynamics Corporation, Rochester, N.Y., a corporation of Delaware Filed Sept. 15, 1960, Ser. No. 56,169
13 Claims. (Cl. 179—1)

The present invention relates to noise discrimination circuits.

It is often necessary to provide circuitry for transmitting audio or voice signals and for preventing the transmission of noise or other signals. For instance, in the use of a mobile radio transmitter, the elimination of background noise produced by machinery when speech is not being transmitted is desirable. The use of a tape recorder in an office suggests the elimination of background noises such as music or the noise produced by the activation of typewriter keys. In telephone lines, noises occurring during intervals when speech is not being transmitted should be eliminated. It is also desirable that a noise discrimination circuit should have a very fast response characteristic so that voice signals may be transmitted without losing portions of speech, which would impair intelligibility.

Accordingly, the principal object of the present invention is to provide a new and improved noise discriminator for allowing the transmission of certain audio signals such as voice signals, and for preventing the transmission of other signals such as noise signals.

A further object of the present invention is to provide a new and improved noise discriminator which is capable of extremely rapid response in its discrimination action so that portions of speech are not lost in transmission, which would impair intelligibility.

It is yet a further object of the present invention to provide a new and improved noise discriminator which is uncomplicated, inexpensive and highly reliable.

It is a feature of the present invention to provide logic circuitry for opening a voice gate in the event that signals having certain frequency characteristics are intermittently present in the input circuit of the voice gate, which characteristics indicate that voice signals are being applied to the gate, and for preventing the opening of the voice gate when signals having other frequency characteristics are present in the input circuit of the voice gate which frequencies may indicate that noise signals are being applied to the gate.

A further feature of the present invention is the provision of means for preventing the opening of the voice gate when the logic circuitry indicates continuously rather than intermittently, that voice signals appear to be present, thereby to prevent continuous noise which may have frequency characteristics very similar to voice signals from being passed by the voice gate.

It is yet a further feature of the present invention to provide a holdover circuit for holding the voice gate open during the transmission of substantially continuous speech and for a fixed interval after the cessation of the speech, so that the voice gate is not intermittently open and closed to thereby "chop" the speech.

It is another feature of the present invention to provide an automatic gain control amplifier between the input circuit of the discriminator and the logic circiut so as to maintain the signal levels applied to the logic circuit constant regardless of variations such as fading, variations in the length of telephone lines, or variations in speech level.

It is yet a further feature of the present invention to provide integrators or time delay circuits within the aforementioned logic circuit so that "distortion noise" produced by the automatic gain control amplifier during the first few milliseconds of operation is not passed by the voice gate.

Further objects and advantages of the invention will become apparent as the following description proceeds, and the features of novelty which characterize the invention will be pointed out with particularity in the claims annexed to and forming a part of this specification.

The figure illustrates an automatic gain control amplifier 1 coupled to an input channel 2, which channel may carry audio signals and noise signals. The output circuit of AGC amplifier 1 is coupled to an outgoing channel 3 through audio gate 4 and conductor 5. The remaining circuitry to be described hereinafter functions primarily to pass signals such as voice signals present in the input channel 2 to the output channel 3 and to prevent the transmission of noise signals present in channel 2 by means of closing audio gate 4.

It has been found that almost all English words contain frequency components having high amounts of energy in the 0–1 kilocycle band and that frequency components having medium amounts of energy are also present either in the 1 to 2 kilocycle band or the 2 to 3.5 kilocycle band. These facts form the basis of the logic decision performed by the gating arrangement disclosed in the drawing. It has also been found that spurious noise signals contain frequency CY components more or less evenly distributed through the zero to 3.5 kilocycle band and that the amount of energy associated with frequency components of noise in the zero to 1 kilocycle band is fairly small.

Let it be assumed that a voice signal is applied to the input circuit of AGC amplifier 1. The frequency components of the voice signal lying in the zero to 1 kilocycle band pass through lowpass filter 6 are applied to integrator-detector 7 which forms part of control circuit 8. For a non-schematic representation of control circuit 8 see United States Patent 3,007,060 of John H. Guenther, patented October 31, 1961, and assigned to the same assignee as the present invention. These frequency components will have sufficient energy to cause Schmidt trigger 9 to change its state thereby to mark lead 11 to partially enable AND gates 12 and 21. Frequency components of the voice signal lying within the 1 to 2 kilocycle band will pass through band-pass filter 13 and will be introduced into the input circuit of integrator-detector 14 which forms part of a control circuit similar to control circuit 8. In like manner, frequency components of the voice signal lying within the 2 to 3.5 kilocycle band will be passed through band-pass filter 16 and will be introduced into the input circuit of integrator-detector 17. Because the voice signal present on input conductor 2 will contain frequency components having considerable energy in either the 1–2 kilocycle band or the 2–3.5 kilocycle band, it follows that either Schmidt trigger 18 or Schmidt trigger 19 will change state thereby to fully enable either AND gate 12 or AND gate 21 which action in turn will cause a mark to be forwarded through OR gate 22 to cause one shot or monostable multivibrator 23 to produce a pulse having a width of approximately 300 milliseconds. This action charges capacitor 24 of holdover circuit 26 thereby to mark conductor 27 which in turn causes audio gate 4 to open.

To briefly recapitulate, if a voice signal is present on input channel 2, Schmidt trigger 9 will partially enable AND gates 12 and 21. In addition, voice signals will cause either Schmidt trigger 18 or Schmidt trigger 19, or both, to change state thereby to fully enable either AND gate 12 or AND gate 21 or both. This action actuates holdover 26 thereby to open audio gate 4 and, accordingly, voice signals present on input conductor 2 will pass through audio gate 4. The response time of the entire circuit is no greater than 20 milliseconds so that ordinary speech will be unimpaired.

Noise present on input conductor 2 will rarely contain frequency components having sufficient energy to actuate trigger 9 and either trigger 18 or 19 to open gate 4. The threshold level needed to operate trigger 9 is made higher than the levels of triggers 18 and 19 to further discriminate betwen voice and noise pursuant to the fact that voice signals have stronger frequency components in the 0–1 kc. band than in the 1–2 kc. and 2–3.5 kc. band.

In telephone applications, it has been found desirable to design holdover circuit 26 so that audio gate 4 remains open for a 5 to 10 second interval after the operation of one shot multivibrator 23. If holdover circuit 26 were absent, sharp variations in speech level would intermittently actuate multivibrator 23 to cause audio gate 4 to open and close which action would severely "chop" the speech signals being transmitted through the circuit to make them unintelligible. On rare occasions, noise present on input conductor 2 may be sufficiently strong to actuate one shot multivibrator 23. However, this type of noise is often continuous so that one shot multivibrator 23 could not be actuated a second time by the noise and, accordingly, audio gate 4 would be closed after the five to ten second interval mentioned hereinbefore, owing to the discharge action of capacitor 24 through resistor 29. Unlike this type of continuous noise, voice signals invariably are interrupted during normal speech so that one shot multivibrator 23 is actuated at least every five seconds thereby to recharge capacitor 24 to hold audio gate 4 open. Even if noise on rare occasions should operate one shot multivibrator 23, the likelihood that this noise should be intermittent so as to actuate one shot multivibrator 23 every five to ten seconds is extremely remote. Voice signals which cease to exist on input conductor 2 for intervals greater than five to 10 seconds would cause gate 4 to close as explained hereinabove to block the passage of background noise through audio gate 4, which is an object of the present invention.

The purpose of AGC amplifier 1, which may be any transistorized amplifier having automatic gain control and a fast response time (e.g. 20 ms. or less), is to keep the energy content of the various frequency components passing through filters 6, 13 and 16 at a constant level regardless of changes in the strength of the voice signals on input conductor 2, which variations may be caused by fading, changes in the length of telephone lines, or changes in voice levels. The amplifier utilized in the present invention was capable of taking a 30 db change in the input signal and "compressing" it to a .5 db change in the output signal at any desired level. However, during the first 20 milliseconds of operation, signals produced in the output circuit of amplifier 1 may be distorted so that it is undesirable to allow them to pass through audio gate 4 during this short time interval. Accordingly, integrators 7, 14 and 17 are provided to delay the actuation of their associated triggers. The integrators utilized in the present invention have delay times of approximately five to ten milliseconds.

Tests have been run on this system using a standard high fidelity tape consisting of word lists, sentences, and various types of factory noise. Due to its pulsating characteristic, typewriter noise was also recorded. Excellent noise immunity was obtained with near perfect voice transmission.

It is obvious that for certain applications, one shot multivibrator 23 and holdover circuit 26 may be eliminated. For instance, if binary information is being handled at a high transmission rate, it may be desirable to close the gate during intervals between sentences or characters, although these intervals may be measured in milliseconds rather than seconds, thereby to prevent error due to noise transmission.

While there has been disclosed what is at present considered to be the preferred embodiment of the invention, other modifications will readily occur to those skilled in the art. It is not, therefore, desired that the invention be limited to the specific arrangement shown and described and it is intended in the appended claims to cover all such modifications as fall within the true spirit and scope of the invention.

What is claimed is:

1. In combination, a gate, an input circuit coupled to an output circuit through said gate, first means coupled to said input circuit for producing an output signal when a fluctuating signal having a first component lying within a first frequency bandwidth of a first given minimum energy content is present in said input circuit, second means coupled to said input circuit for producing an output signal when a fluctuating signal having a second component lying within a second frequency bandwidth of at least a second given minimum energy content is present in said input circuit, third means coupled to said input circuit for producing an output signal when a fluctuating signal having a third component lying within a third frequency bandwidth of at least a third given minimum energy content is present in said input circuit, and control means coupled to the output circuits of said first, second, and third means for opening said gate when said first means produces an output signal and either said second means produces an output signal or said third means produces an output signal.

2. The combination as set forth in claim 1 wherein said control means includes means for holding said gate open at least as long as output signals produced by said first and second means are interrupted at least at a minimum rate and for closing said gate if said output signals are not interrupted at least at said minimum rate.

3. The combination as set forth in claim 1 wherein an automatic gain control device is coupled between said input circuit and said first and second means.

4. In combination, a gate, an input circuit coupled to an output circuit through said gate, first means coupled to said input circuit for producing an output signal when a fluctuating signal having a first component lying within a first frequency bandwidth of a first given minimum energy content is present in said input circuit, second means coupled to said input circuit for producing an output signal when a fluctuating signal having a second component lying within a second frequency bandwidth of a second given minimum energy content which is less than said first given minimum energy content is present in said input circuit, third means coupled to said input circuit for producing an output signal when a fluctuating signal having a third component lying within a third frequency bandwidth of a minimum energy content which is less than said first given minimum energy content is present in said input circuit, and control means coupled to the output circuits of said first, second, and third means for opening said gate when said first means produces an output signal and either said second means produces an output signal or said third means produces an output signal.

5. The combination as set forth in claim 4 wherein said control means includes means for holding said gate open at least as long as output signals produced by said first and second means are interrupted at least at a minimum rate and for closing said gate if said output signals are not interrupted at least at said minimum rate.

6. The combination as set forth in claim 4 wherein an automatic gain control device is coupled between said input circuit and said first and second means.

7. In combination, an input circuit, an output circuit, first means coupled to said input circuit for producing an output circuit when a fluctuating signal having a first frequency lying within a first bandwidth and having a first minimum energy content is present in said input circuit, second means coupled to said input circuit for producing an output signal when a fluctuating signal having a second frequency lying within a second bandwidth and having a second minimum energy content which is less than said first minimum energy content is present in said input circuit, third means coupled to said input circuit for producing an output signal when a fluctuating signal having a third frequency lying within a third bandwidth and having a minimum energy content which is less than said first minimum energy content is present in said input circuit, and fourth means coupled to the output circuits of said first, second, and third means for giving an indication when said first means produces an output signal and either said second means produces an output signal or said third means produces an output signal.

8. The combination as set forth in claim 7 wherein an automatic gain control device is coupled between said input circuit and said first means.

9. In combination, an input circuit, an output circuit, first means coupled to said input circuit for producing an output circuit when a fluctuating signal having a first frequency lying within a first bandwidth and having a first minimum energy content is present in said input circuit, second means coupled to said input circuit for producing an output signal when a fluctuating signal having a second frequency lying within a second bandwidth and having a second minimum energy content which is less than said first minimum energy content is present in said input circuit, third means coupled to said input circuit for producing an output signal when a fluctuating signal having a third frequency lying within a third bandwidth and having a minimum energy content is present in said input circuit, and fourth means coupled to the output circuits of said first, second, and third means for giving an indication when said first means produces an output signal and either said second means produces an output signal or said third means produces an output signal.

10. The combination as set forth in claim 6 wherein delay means are included within said first means.

11. In combination, a gate, an input circuit coupled to an output circuit through said gate, first means coupled to said input circuit for producing an output signal when a fluctuating signal having a first component lying within a first frequency bandwidth is present in said input circuit, second means coupled to said input circuit for producing an output signal when a fluctuating signal having a second component lying within a second bandwidth is present in said input circuit, and control means coupled to the output circuits of said first and second means for opening said gate when both said first and second means produce an output signal, said control means including means for holding said gate open at least as long as output signals produced by said first and second means are interrupted at least at a minimum rate and for closing said gate if said output signals are not interrupted at least at said minimum rate.

12. In combination, a gate, an input circuit coupled to an output circuit through said gate, first means coupled to said input circuit for producing an output signal when a fluctuating signal having a first component lying within a first frequency bandwidth having a first minimum energy content is present in said input circuit, second means coupled to said input circuit for producing an output signal when a fluctuating signal having a second component lying within a second bandwidth and having a second minimum energy content which is less than said first minimum energy content is present in said input circuit, and control means coupled to the output circuits of said first and second means for opening said gate when both said first and second means produce an output signal, said control means including means for holding said gate open at least as long as output signals produced by said first and second means are interrupted at least at a minimum rate and for closing said gate if said output signals are not interrupted at least at said minimum rate.

13. A detector comprising first frequency responsive threshold means for producing an output signal therefrom only in response to a signal having at least a first predetermined energy content falling within a first predetermined frequency band being applied as an input thereto, second frequency responsive threshold means for producing an output signal therefrom only in response to a signal having at least a second predetermined energy content falling within a second predetermined frequency band being applied as an input thereto, said first predetermined energy content being greater in magnitude than said second predetermined energy content, input means coupled to said first and second frequency responsive threshold means for applying the same fluctuating signal as an input to both said first and said second frequency responsive threshold means, and means coupled to both said first and said second frequency responsive threshold means for producing an output therefrom only in response to the presence of output signals from both said first and said second frequency responsive threshold means.

References Cited in the file of this patent

UNITED STATES PATENTS

| | | |
|---|---|---|
| 2,288,000 | Kelly | June 30, 1942 |
| 2,446,244 | Richmond | Aug. 3, 1948 |
| 2,761,062 | Wirkler | Aug. 28, 1956 |
| 2,883,525 | Curtis | Apr. 21, 1959 |
| 2,957,939 | Morris | Oct. 25, 1960 |